United States Patent [19]
Waterloo

[11] 3,753,636
[45] Aug. 21, 1973

[54] PHASE VARIATOR FOR BLOW MOLDING EQUIPMENT

[75] Inventor: William C. Waterloo, York, Pa.

[73] Assignee: Graham Engineering Corporation, York, Pa.

[22] Filed: Mar. 12, 1971

[21] Appl. No.: 123,594

[52] U.S. Cl. ............... 425/163, 425/146, 425/155, 425/168, 425/381, 425/465, 425/466
[51] Int. Cl. .......................................... B29d 23/04
[58] Field of Search ............. 18/14 V, 5 B, DIG. 33; 262/98, 99, 167, 209, DIG. 33; 425/381, 162, 465, 466, 146, 168, 155, 163

[56] References Cited
UNITED STATES PATENTS

| | | | |
|---|---|---|---|
| 3,538,548 | 11/1970 | Tenner | 18/14 V |
| 2,750,625 | 6/1956 | Colombo | 18/5 BV |
| 3,002,615 | 10/1961 | Lemelson | 264/DIG. 33 |
| 3,368,241 | 2/1968 | Williams | 264/DIG. 33 |

*Primary Examiner*—Robert L. Spicer, Jr.
*Attorney*—C. Hercus Just

[57] ABSTRACT

A phase variator for a blow molding machine to (1) adjust and orient the profile of a parison relative to movable mold cavities as they are positioned around the parison prior to inflating the parison, and (2) regulate the timing with which the variations in the profile (i.e. wall thickness) are imparted to the parison. Such regulations may be made and adjusted while the machine is operating.

19 Claims, 6 Drawing Figures

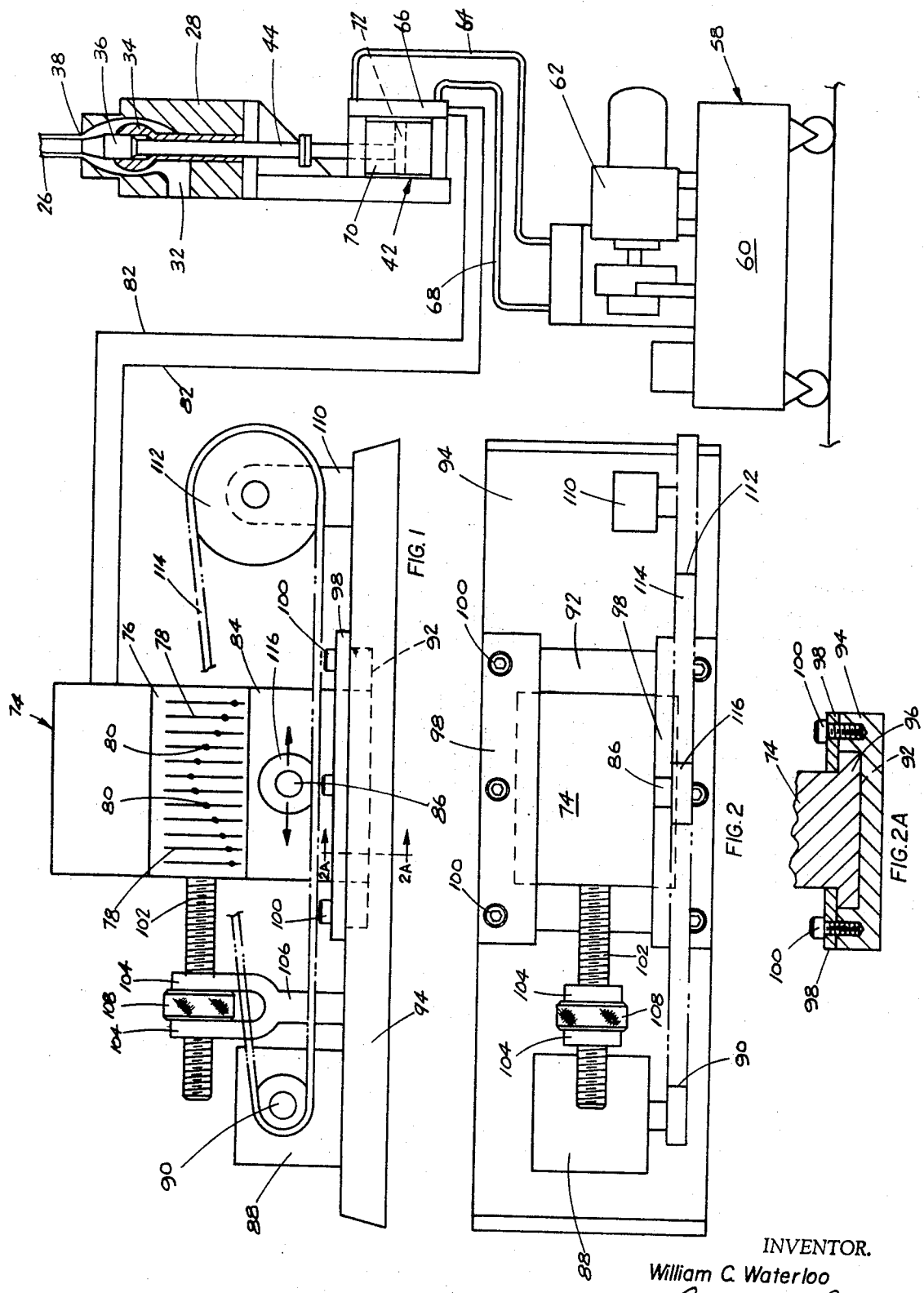

Patented Aug. 21, 1973
3,753,636
2 Sheets-Sheet 2
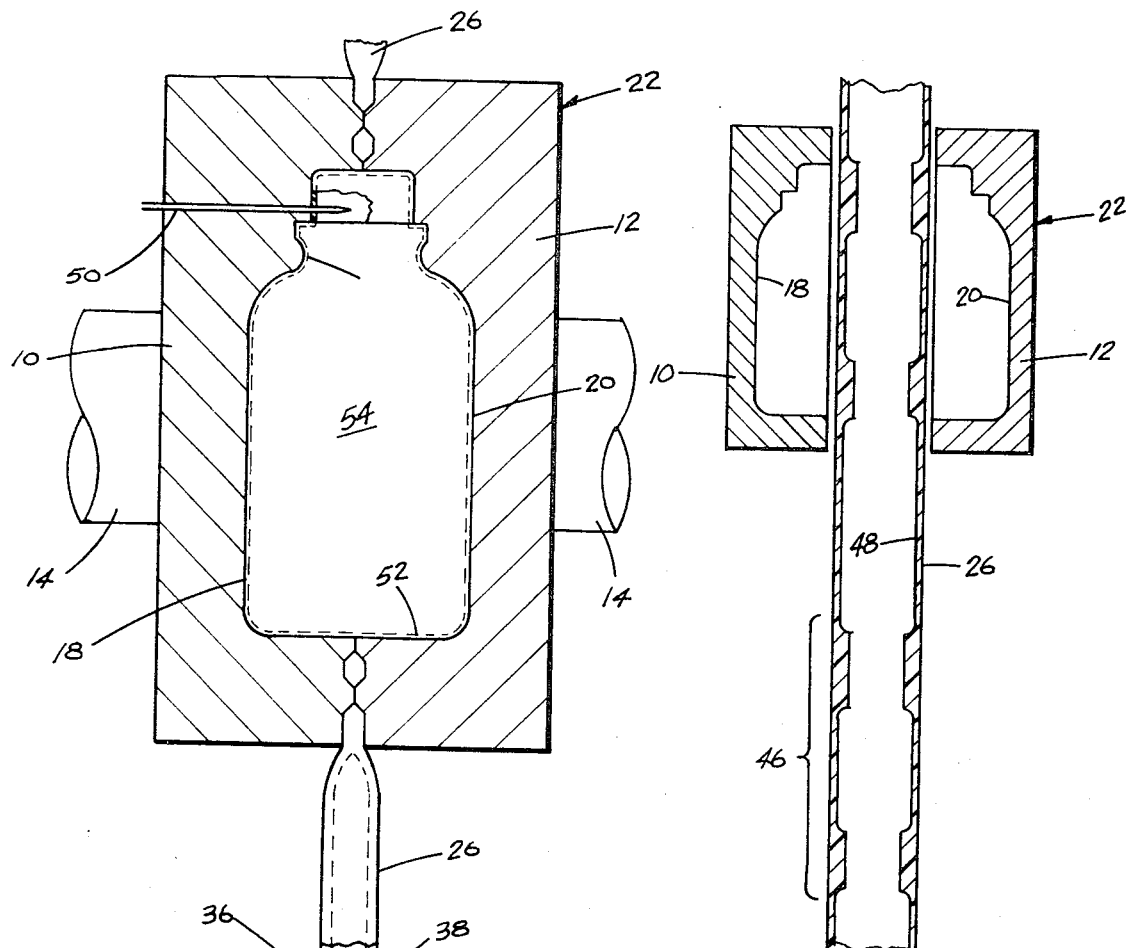
FIG.3
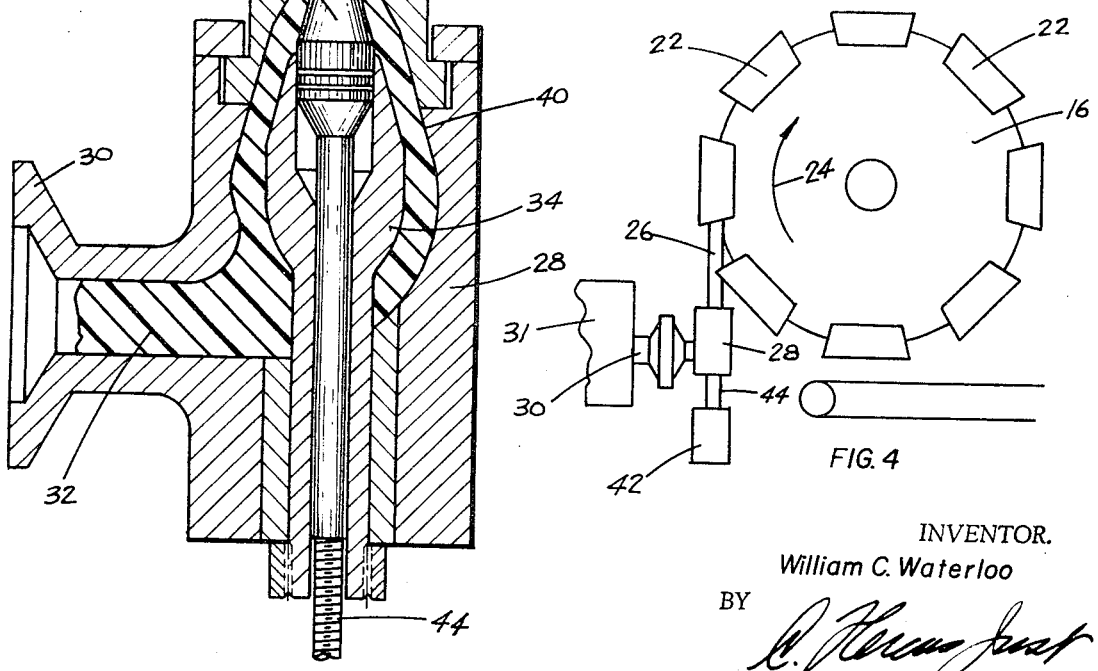
FIG.5
FIG.4
INVENTOR.
William C. Waterloo
BY
ATTORNEY

PHASE VARIATOR FOR BLOW MOLDING EQUIPMENT

CROSS-REFERENCE TO RELATED APPLICATION

The present invention is applicable to the Method and Apparatus for Extruding Synthetic Plastic Resins at Low Temperatures and Product, which comprises the subject matter of applicants' co-pending application, Ser. No. 73,870, filed Sept. 21, 1970.

The present invention relates to the extrusion of parisons and more particularly to apparatus for regulating the orientation of the parison with respect to the mold elements in which it is formed into a finished element.

In the blow molding of plastic containers, it is known to vary the thickness of the walls of a parison to regulate the distribution of the material in the final product, i.e., the container. This is generally done by raising or lowering a die pin extruder head to produce a parison having a wall thickness which varies along its axial length. The resulting parison then is placed between a pair of mold die elements which enclose a portion of the parison and close off its opposite ends by pinching them. A gaseous fluid, such as air then is blown into the portion of the parison which is within the mold to expand it into conformity with the mold walls to form the container.

Heretofore, regulating the position of the parison with respect to the mold has not been easy, particularly in rotary blow molding equipment in which the molds generally are mounted on a ferris wheel and moved continuously in a circular path about the central axis of the wheel. U. S. Pat. No. 2,579,399 shows a typical example of this type of molding machine.

In such typical type of equipment, a plurality of molds are spaced apart on the circumference of the wheel and as it rotates about its axis, one after the other, the molds are moved past a head from which the parison is extruded. Any method of regulating the position of a parison of variable wall thickness with respect to the mold elements involves regulating the wall thickness of the parison in timed relation with the rotation of the ferris wheel so that that portion of the parison having a desired wall thickness will be positioned adjacent a predetermined part of the mold in order that when the mold closes about the parison and the container is blown, it will have the desired wall thickness.

The foregoing technique involves not only synchronizing the rotation of the ferris wheel with the extruder, but it also requires seeing to it that the variations in wall thickness of the parison are imparted to it at a precise time with respect to the position of the ferris wheel so that the wall thickness profile imparted to the parison will be in phase with (i.e., in precise alignment with) the contour of the mold elements with respect to which alignment is desired when the mold elements are clamped around the parison. If this alignment, or in-phase relationship, is not achieved the material in the parison will be distributed improperly in the final product and will result in such product being unacceptable for use.

Heretofore, adjustments in the phase relation between parison and mold profile primarily have been made by changing the speed of the ferris wheel or the extruder until the profile of the parison is in phase or properly aligned with the contour of the mold. This is a difficult operation to achieve and, at best, only sets up the initial conditions of the operation. If, thereafter, the speed of the wheel or the extruder or programming device which imparts the profile to the parison gets out of adjustment, the phase relation is lost and a change has to be made to establish a new phase relationship.

It therefore is one object of the invention to improve the ease with which the profile of a parison is brought into alignment with a mold cavity in a blow molding apparatus.

Another object is to provide an improved apparatus for simultaneously regulating the phase relationship of all portions of the profile of the parison with the contours of the molds in rotary blow molding apparatus.

A further object is to provide an apparatus having the above characteristics in which the phase relation between the parison and the molds is continuously regulatable throughout the operation of the apparatus.

Still another object is to provide an improved apparatus for blow molding articles which not only is adapted to vary the wall thickness of a parison along its length in accordance with a predetermined program, but also is adapted to regulate the timing with which the program of variations in wall thickness is imparted to the parison.

Further, other and additional objects and advantages of the invention will become obvious from the summary and following detailed description taken in connection with the drawings and from the appended claims.

DESCRIPTION OF THE DRAWINGS

FIG. 1 is a diagrammatic elevation, partly in section, of parison-forming mechanism according to the preferred embodiment of the invention.

FIG. 2 is a top plan view of part of the mechanism shown in FIG. 1.

FIG. 2A is a fragmentary vertical elevation of a detail of the mechanism, as seen on the line 2A—2A of FIG.1.

FIG. 3 is a vertical elevation view showing a parison head of the type illustrated in FIG. 1 which is operable to discharge a parison upwardly for disposition within molding dies in accordance with the principles of the invention.

FIG. 4 is a small scale diagrammatic side elevation of the parison extruder head and Ferris wheel on which molds are mounted to illustrate the relative positions of such elements in accordance with the preferred embodiment of the invention.

FIG. 5 is an exemplary longitudinal sectional view of one example of a parison section to illustrate the profile thereof.

DETAILED DESCRIPTION

The essential features of the present invention primarily are illustrated in FIGS. 1 and 2. However, in order to afford a basis for understanding the significance of the improvements afforded thereby, the following description of certain rudimentary principles and basic apparatus for forming hollow articles from synthetic resin by a blowing-in-the-mold technique are set forth below with reference to FIGS. 3 - 5 in conjunction with the same.

In FIG. 3, a pair of complementary, exemplary molding dies 10 and 12 are illustrated which are supported on suitable members 14 constituting parts of a Ferris wheel mold-supporting system 16 shown in FIG. 4. The molding dies 10 and 12 have complementary molding cavities 18 and 20 therein. The dies 10 and 12 are mounted for reciprocal movement toward and from each other along the axis of the supporting members 14. In addition, a plurality of pairs 22 of such molding dies, such as shown in FIG. 4, are moved through a predetermined circular path as indicated by the directional arrow 24 in FIG. 4, for purposes of sequentially presenting such pairs of dies in position to receive therebetween connected portions of the hollow, thermoplastic synthetic resin parison 26.

According to the preferred manner of operating the machine comprising the present invention, the parison 26 is formed by a parison head 28, details of which are best shown in FIG. 3. The parison head 28 is connected to the discharge end 30 of a resin extruder 31 of suitable, conventional type which is adapted to thoroughly blend and plasticate thermoplastic synthetic resin and discharge a substantially continuous stream or mass 32 of plasticated resin into the parison head 28 so as to flow around the parison head mandrel 34 and the terminal end of the die pin 36 which operates within the discharge opening 38 in the parison head 28.

In accordance with conventional operation principles, the die pin 36 normally is stationary, although said mandrel preferably is longitudinally adjustable within the inner cavity 40 of parison head 28 for purposes of controlling the amount of plasticated resin which is constantly being delivered to and discharged from the opening 38 of head 28.

The die pin 36 is reciprocable relative to both the parison head mandrel 34 and the discharge opening 38 of inner cavity 40 of the parison head 28. Said die pin is reciprocated by a programming control unit 42, see FIG. 4, from which a rod 44 extends for connection to the die pin 36. The present invention is very largely concerned with the programming control unit 42, as will be seen from the description set forth herinafter, particularly for purposes of adjusting the reciprocating program of the die pin 36 relative to the position of a predetermined section of the parison 26 which has a preferred sectional profile shown in exemplary manner in FIG. 5. An exemplary profile section of parison 26 is indicated by the bracket 46 in FIG. 5.

It is to be understood that the profile of the parison 26 shown in FIG. 5, while exemplary, is of a practical type. Referring to said figure, it will be seen that the outer cylindrical surface of the parison 26 is of substantially uniform diameter but the inner surface 48 varies in thickness in accordance with a precise pattern or program to establish a desired inner profile. The purpose of the variation in the wall thickness of the parison 26 is to provide additional resin volume, where needed, when the particular section 46 of the parison which is enclosed between each pair of molding dies 22 is inflated or blown by means of air or other suitable gaseous fluid introduced to the interior of the parison through a blow needle 50, such as shown in exemplary manner in FIG. 3.

It also will be understood that as each section 46 of the profiled parison is enclosed between a pair of molding dies 22 by moving the dies 10 and 12 from an open position, as shown in exemplary manner in FIG. 5, to a closed position as shown in FIG. 3, in those locations where additional resin is needed, such as to form a horizontal bottom 52 in the molded hollow object 54 shown in FIG. 3, the additional resin contained in certain portions of the parison section 46 are available for that purpose. In this particular illustration, an additional amount of resin also is necessary in order to form the upper, neck portion 56, for example, of the exemplary molded container 54 shown in FIG. 3.

Therefore, it should be apparent from FIGS. 3 - 5 that it is quite essential that the profile of each section 46 of the parison 26, which is to be expanded by blowing into a molded object 54, be precisely located longitudinally with respect to the axis of the cooperating or complementary molding cavities 18 and 20 within each pair of molding dies 22. Hence, one of the principal objectives of the present invention is to provide mechanism by which all the sections 46 of the parison 26 can be suitably oriented in unison and simultaneously relative to such molding die cavities by adjustment of the programmed reciprocation of the die pin 36. Details and characteristics of the machine comprising the present invention which accomplish the foregoing objectives are illustrated in FIGS. 1 and 2, to which attention now is directed.

Referring particularly to FIG. 1, exemplary power mechanism, preferably of a hydraulic nature, is illustrated in the lower right-hand corner of said figure. If desired, the hydraulic unit 58 may either be stationary or portable. The particular illustration shows one which is portable but this is illustrative and not restrictive. The unit 58 includes a reservoir 60 for hydraulic fluid. Pump 62 withdraws fluid from the reservoir 60 and places it under pressure for delivery through conduit 64 to one end of servo-valve 66 and return conduit 68 receives fluid from the opposite end of servo-valve 66 and returns it to the reservoir 60.

Programming control unit 42 includes a double-acting hydraulic unit 70 comprising a cylinder within which a piston 72 is reciprocable in opposite directions. The rod of said piston is connected to the rod 44 by which the die pin 36 is reciprocated.

Details of the servo-valve 66 are not illustrated since the same is of known commercial type including a shiftable valve member adapted to control the directing of hydraulic fluid to act against one face or the other of the piston 72, or permit the same to remain stationary, as required, in order to form the profile of the parison 26 by programmng either the necessary reciprocation of the die pin 36, or permitting the same to remain stationary, for required intervals, during which sections of uniform diameter of the parison 26 are produced.

The movable valve member within the servo-valve 66 is controlled by an electric switch console 74 which includes a closed loop system that constantly monitors its own regulation. This includes a profile selector switch 76. In the specific illustration shown in FIG. 1, a series of 12 individual profile selector switches 78, per se, are illustrated. As many of these switches 78 as are desired or necessary may be used. Each switch 78 has an adjustable resistor 80 which is represented diagrammatically by a dot upon each of the lines representing the selector switches per se in FIG. 1. Each resistor is sequentially connected within the circuit of the electric switch console 74, which, in turn, is connected by conduits 82 to the electrical mechanism which actuates the movable valve member of the servo-valve 66. A conventional electrical device for actuating said movable valve member is a reciprocating solenoid armature, not shown.

The resistors 80 are sequentially connected into the circuit of the electric switch console 74 by means of a mechanically driven sequencing reed switch 84 of industrial type. Said switch comprises a rotatable switch member, not shown, carried by a driven rotatable member 86. Said driven switch member is rotated relative to a circular series of contacts, not shown, at a predetermined, constant speed by suitable means such as a synchronized drive. One type of such drive may comprise an electric motor 88 which operates at a predetermined constant speed during any given operation of the apparatus and drives a driving pulley 90. In accordance with the principles of the invention, however, the driving pulley 90 is connected to the driven switch member 86 in a manner that permits variation in the operating phase of switch console 74 relative to driving pulley 90. Details of the mechanism which affords such variation are set forth as follows.

Although various ways are possible to effect such aforementioned phase variation, a very simple arrangement has been selected for use in the present apparatus and is illustrated in exemplary, somewhat diagrammatic manner in FIGS. 1 and 2. From these figures, it will be seen that the switch console 74 is movable in opposite directions toward and from the axis of driving pulley 90. A simple expedient to accomplish this comprises a guide recess 92 in base member 94. Suitable precise, slidably interengaging means of well known type may be used, such as integral side flanges 96 along opposite sides of the base portion of console 74 which slide with said base portion in recess 92 of base member 94. Retaining strips 98 slidably overlie the upper surfaces of flanges 96 and are secured to base member 94 by bolts 100. Other mechanical equivalents may be used in lieu of the details described above.

Adjustable positioning or orienting of console 74 relative to driving pulley 90 is effected by exemplary means such as a threaded shaft 102 which, at one end, is fixed to the casing of console 74. Said shaft extends through guides 104 of a yoke 106 between which a knurled nut 108 is rotatable but is precisely fitted against axial movement and is threaded onto shaft 102. Yoke 106 is rigidly connected to base member 94.

At the opposite end of base 94 from motor 88 is a support 110 for an idler pulley 112 which rotates around a fixed axis on support 110. A timing belt or chain 114 extends around the driving pulley 90 and idler pulley 112. If desired, a suitable adjustable take-up idler, not shown, may be used to insure desirable tensioned engagement between said pulleys and belt or chain. One course of belt or chain 114 engages a pulley 116 fixed to driven rotatable switch member 86 of the sequencing reed switch of console 74. It is to be understood that the pulleys 90, 112 and 116 are of similar type and the peripheries are complementary to the timing belt or chain 114, regardless of whether the latter is a sprocket chain or timing belt, as long as there is positive, timed non-slipping engagement between the endless flexible timing belt or chain and the members 90, 112 and 116 which may be timing pulleys or sprocket gears, as required.

When the apparatus is set up for operation, the adjustable resistors 80 of the profile selector switches 78 per se of the profile selector switch unit 76 are suitably adjusted to cause the servo-valve 66 to function in a predetermined cycle which is dictated by the various settings of the switches 78. The parison head mandrel 34 is actuated in the desired direction, or remains momentarily stationary, by operation of the hydraulic unit 70 of the programming control unit 42, as required to produce the desired parison profile. The servo-valve 66 is actuated directly by the electric switch console 74 in accordance with the settings of the individual profile selector switches 78 to sequentially move die pin 36 relative to discharge opening 38.

It is to be understood that the rate of delivery of flowable synthetic resin 32 is constant for any given operation to and through parison head 28. Thus, by varying the position of the die pin 36 relative to the discharge opening 38 of the parison head 28, the wall thickness of the parison 26 will be varied correspondingly to produce a desired parison contour such as the exemplary interior contour of the parison illustrated in FIG. 5. As the parison moves through the discharge opening 38 of head 28, the thicker wall sections of the parison will move at a slower rate than the thinner wall sections due to the constant volume rate of the resin 32 delivered to said head.

From the foregoing, it will be apparent that the variable programmed positioning of the die pin 36 relative to opening 38 must be in sequential phase with the positioning movement of the complementary molding cavities 18 and 20 relative to the constantly discharging parison. The contours of cavities 18 and 20 require different wall thicknesses of the parison 26 to provide, for example, adequate resin to form a hollow molded object such as the container 54 shown in FIG. 3. It will be seen that the sidewalls are of uniform thickness and are formed from a section of the parison which has a relatively thin uniform wall thickness, while the bottom 52, which is transverse to the sidewalls, must be formed from a section of the parison which has a thicker wall than the aforementioned section. The upper neck portion 56, which has cap or cover attaching means, such as threads, also must be formed from a section of the parison having a thicker wall than that which forms the sidewalls of the container.

Therefore, it will be seen that the positioning of various sections of the parison relative to certain precise locations in the mold cavities requires very accurate phasing between the functioning of the servo-valve 66, for example, and the drive of the mold carrying and supporting system 16 which is illustrated herein as a so-called Ferris wheel. To facilitate such relationship, the driving pulley 90 for timing belt or chain 114 may be driven either by constant speed motor 88, or preferably, pulley 90 is directly connected by suitable means, not shown, to the drive means for the Ferris wheel 16. Hence, the mold cavities 18 and 20 of the pairs of dies 22 will sequentially encircle sections of the parison 26 in precise phase relationship with the required wall contours thereof to cause the parison to be expanded against the mold cavity surfaces and produce desired wall and other contours of required thickness and extent in the molded object.

As indicated above, when operation of the apparatus is initiated, the required phased timing relationship between the parison formation and feed, and the positioning movement of the mold cavities is established. Producing the desired parison contour is accomplished by adjusting the individual profile selector switches 78 of switch console 74 until the desired operating program of die pin 36 is established to produce such contour. When this has been accomplished, orienting such programmed operation of parison head 28 with the movement of the pairs of molding dies 22 is achieved by the phase variating and adjusting mechanism comprising the movement of the electric switch console 74 by means of manipulating knurled nut 108 in the direction required to produce the desired phase relationship between the parison contour and mold cavities by simultaneously adjusting the entire program of movement of die pin 36 by said control means to orient said entire profile of the parison relative to said mold cavities.

Producing such desired phase relationship is accomplished by moving the respective engagements of drive pulley 90 and driven timing pulley 116 with the endless flexible timing belt or chain 114. By selecting and observing a specific reference point on each of said pulleys with corresponding points engaged thereby on belt or chain 114, it will be seen that movement of console 74 in one drection or the other by manipulation of nut 108 will effect an adjustment between the operation of servo-valve 66 and the drive for the mold carrier 16 and, correspondingly, change the phase relationship between the programmed contour or profile of the parison 26 and the mold cavities 18 and 20. This is due to effecting a different displacement between the axes of the driving pulley 90 and the pulley 116 which results in a shift, in the desired axial direction, between the parison 26 profile and the mold cavities 18 and 20.

From the foregoing, therefore, it will be seen that either while the apparatus is idle or operating, the operating phase of the profile selector switch 76 may be shifted, as desired, to bring the parison 26 profile into correct operating phase with the mold cavities 18 and 20. Also, the shape of the profile of the parison 26 may be varied, either while the apparatus is idle or operating, by manipulating the profile selector switches 78 of the console 74. The latter type of adjustment will cause a shift in the masses of the resin in the walls of the parison, whereby the thickness of the walls and other portions or sections of the molded articles may be varied. Effecting such shift or change in the mass of resin in the successive sections of the parison while the apparatus is operating will permit quick inspection of the product and, if it is found to be different from the required or desired configuration, wall thickness and the like, immediate adjustment of either the phase relationship between the parison and mold cavities or adjustment of the parison program for the servo-valve may be effected until the molded product complies with the intended characteristics of the product.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A machine for molding hollow articles from thermoplastic synthetic resin by blowing gaseous fluid into a hollow parison having a predetermined profile adapted to be oriented relative to a mold cavity in which said parison is positioned while the mold is moving in a predetermined path, said machine comprising in combination, a parison head, a die pin mounted in said head for axial reciprocation therein to provide an annular discharge opening for forming a desired profile within said parison, separable molding dies mounted for movement toward and from molding position and having cooperating cavities encircling said parison when said dies are in closed position, means to move said molding dies in unison along a predetermined path, power means operable to reciprocate said die pin to form the profile of said parison, control means for said power means operable to program precise movement of said die pin by said power means, and orienting means connected to said control means and operable to adjust the entire program of movement of said die pin by said control means simultaneously to orient said profile of said parison relative to the mold cavity formed by said molding dies when in molding position.

2. The machine according to claim 1 in which said power means which reciprocates said die pin comprises a double acting hydraulic unit connected to said die pin and having a piston reciprocatable within a ported cylinder, and said power means also including an electrically operated servo-valve connected to the ports of said cylinder to control the flow of fluid to and from the opposite ends of said cylinder.

3. The machine according to claim 2 in which said control means for said power means comprises a switch connected to said servo-valve and operable in response to a predetermined program delivered to said switch in accordance with the desired profile of a parison to actuate said switch to effect desired movement of said servo-valve.

4. The machine according to claim 2 in which said control means for said power means comprises a reed-type switch having a rotatable contact, and said control means also including means to drive said rotatable contact at a predetermined speed, and said phase orienting means being interconnected to said means to drive said rotatable contact.

5. The machine according to claim 4 in which said reed-type switch includes a plurality of adjustable resistors operable to control the movement and duration of movement or non-movement of said servo-valve.

6. The machine according to claim 5 in which said means to drive said rotatable contact comprises power means operable to drive said contact at substantially constant speed and said phase orienting means comprises means to vary the phase relationship between said power means and said reed-type switch.

7. The machine according to claim 6 further including means interconnecting said drive means for said rotatable contact and said power means, and means to effect adjustment between said drive means and interconnecting means to vary the operating phase between said drive means and power means.

8. The machine according to claim 6 in which said phase variating means comprises a rotatable drive member on said power means, a rotatable driven member on said rotatable contact, a flexible timing type drive member extending between and connecting said rotatable drive and driven members, and means operable to vary the distance between the axes of said drive and driven members and thereby shift the phase between the same as aforesaid.

9. The machine according to claim 8 furher including a rotatable idler member and said flexible timing type drive member being endless and extending around said drive member and idler member and one course thereof engaging said driven member to drive it, and means supporting said rotatable contact for movement longitudinally of said course of said endless drive member to effect variation in the operating phase between said drive and driven members.

10. The machine according to claim 1 in which said orienting means comprises phase variating means adjustably operable while the machine is operating to adjust said control means to effect a shift in the profile of said parison relative to said mold cavity.

11. The machine according to claim 10 in which said phase variating means includes an adjustable member operable manually.

12. The machine according to claim 1 in which said control means for said power means comprises an electric switch unit having a movable switching member continuously operable through a predetermined program to effect a desired cycle of movement of said die pin, power means to drive said switching member, and said orienting means being operable to shift said switching member relative to said drive therefor to adjust the operating phase between the movement of said parison and said mold cavity.

13. The machine according to claim 12 in which said orienting means is connected to said switching member to position it adjustably relative to said drive means, and said orienting means being adjustable while said machine is operating to change said operating phase between said parison and mold cavity therefor.

14. The machine according to claim 1 further including means to support a plurality of said molding dies for movement along a continuous path, power means to drive said mold supporting means, and means to operate said power means to reciprocate said die pin of said parison head in direct timed relationship with the mold positioning movement of said mold supporting means, whereby adjustment of said orienting means for said control means causes a change in the phase relation between said parison as continuously formed by said parison head and the position of said mold cavities relative to said parison as said cavities are moved by said mold supporting means for engagement with said parison.

15. The machine according to claim 14 in which said control means comprises a plurality of profile selector switches operable in a programmed sequence by a movable switching member and said power means comprising an electrically operable servo-valve and a hydraulic cylinder and piston unit controlled thereby to shift said die pin of said parison head cyclically as required to form a parison having a predetermined profile, said orienting means being operable to shift the sequential operating phase of said selector switches relative to the cycle of movement of said molding dies to effect a shift in position of said parison relative to said molding dies.

16. The machine according to claim 15 in which said profile selector switches each include an adjustable resistor connected in the electrical operating circuit of said servo-valve and operable to effect desired directed reciprocation or dwell of the piston of said hydraulic cylinder and piston unit, and means to adjust said respective profile selector switches to provide an operating program for said hydraulic cylinder and piston unit to produce a parison having a predetermined profile.

17. The machine according to claim 15 further including a movable switching member operable to sequentially operate said series of profile selector switches, power means for said switching member operable at a predetermined speed in correlation with the movement of said mold supporting means, driven means for said switching member connected to said power means, and means to shift said connection between said driven means and power means for said switching member to effect a change in operating phase between said parison and the cavities of said molding dies.

18. In apparatus for blow molding articles having a parison head, a die movable therein for forming a hollow parison having a predetermined profile along its length, and a pair of molding dies having portions for clamping around a length of the parison, power means operable to reciprocate said die pin to form the profile of said parison, and control means for said power means operable to program precise movement of said die pin by said power means, the improvement comprising orienting means connected to said control means and operable to adjust simultaneously the relative positions of all portions of the parison profile longitudinally relative to the molding dies during operation of the apparatus to insure that all said portions of said profile are positioned at a predetermined location between corresponding portions of the dies which clamp around the parison before the articles are formed.

19. The improvement according to claim 18 wherein the apparatus includes means for repetitively imparting a predetermined profile to the parison along its length and the means for adjusting the position of the profile relative to the molding die portions includes a device connected to the profile imparting means for shifting the position of the profile along the length of the parison.

* * * * *